Jan. 20, 1953 — W. V. RICHARDS — 2,626,299
WATERPROOF RECEPTACLE
Filed May 10, 1949 — 2 SHEETS—SHEET 1
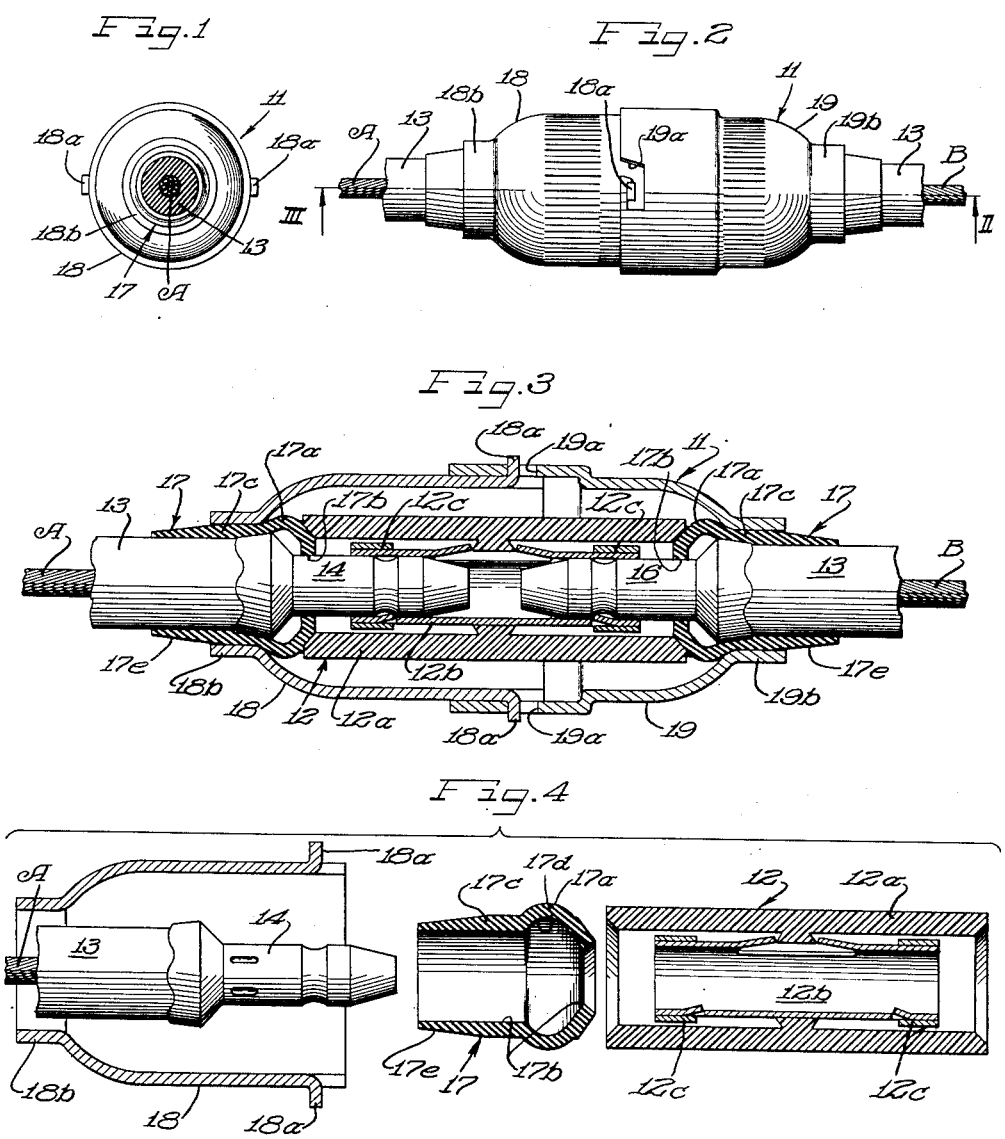
Inventor
Wayne V. Richards

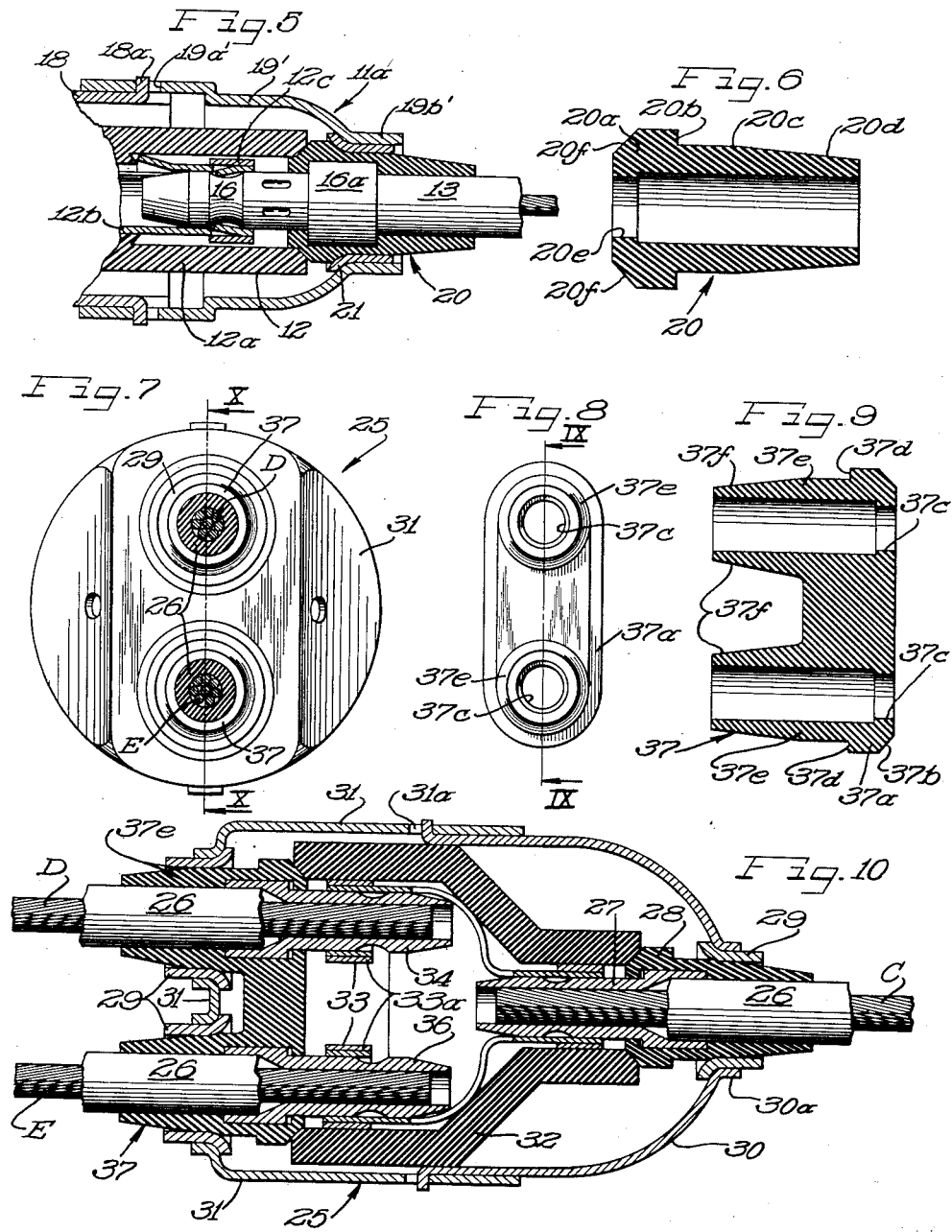

Patented Jan. 20, 1953

2,626,299

UNITED STATES PATENT OFFICE 2,626,299

WATERPROOF RECEPTACLE

Wayne V. Richards, Union City, Mich., assignor to Kingston Products Corporation, Kokomo, Ind., a corporation of Indiana Application May 10, 1949, Serial No. 92,448

9 Claims. (Cl. 173—328)

This invention relates generally to separable connectors and particularly to a separable connector having component parts assembled in a novel manner in which certain of the parts are arranged to provide a water-tight seal when the connector is placed in assembled relationship.

The desirability and utility of waterproof connectors has been demonstrated in many diverse environments where the application of electrical apparatus or electric circuits is required.

A particularly advantageous application of a waterproof connector can be made to military equipment which is designed to operate under the most difficult of environmental conditions, for example, amphibious operations in a strategic land-sea locale.

Heretofore most waterproof connectors have consisted of elaborate fitted assemblies or expensive integral mouldings of rubber elements.

An object of this invention is, therefore, to provide a waterproof connector which is formed of relatively simple parts assembled in a novel manner to form a tightly locked waterproof connection at the locale of a cooperating socket and plug.

Another object of this invention is to provide a novel grommet made of resilient material which, when used in a connector assembly performs the dual function of resiliently locking interconnecting members in place and providing an efficient water-tight seal at the locale of a socket and plug.

Yet another object of this invention is to provide a separable connector which is inexpensive to manufacture but which is completely efficient for its intended purpose.

According to the features of this invention a separable connector is provided which includes a socket and a plurality of plugs receivable therein each having a resilient grommet defining a socket-seating shoulder and a sleeve portion cooperable with interlocking means which elastically deforms the grommets in such a manner as to form a water-tight seal at the locale of the socket and the plug.

Many other objects and advantages of the present invention will become manifest to those versed in the art upon making reference to the detailed description which follows and the accompanying drawings in which:

Figure 1 is an end view of a separable connector embodying the principles of my invention;

Figure 2 is a side elevational view of the separable connector shown in Figure 1;

Figure 3 is a cross sectional view taken along line III—III of Figure 2;

Figure 4 is an exploded view showing the order of assembly and additional details of construction of the various elements comprising a separable connector embodying the principles of my invention;

Figure 5 is a partial cross sectional view broken away to show a modified form of a separable connector embodying the principles of the present invention;

Figure 6 is a cross sectional view of the modified resilient grommet used in the structure depicted in Figure 5;

Figure 7 is an end elevational view of a multi-wire separable junction connector embodying the principles of my invention;

Figure 8 is an end elevational view of a resilient grommet used in the structure shown in Figure 7;

Figure 9 is a cross sectional view taken on line IX—IX of Figure 8; and

Figure 10 is a cross sectional view taken on line X—X of Figure 7.

As shown on the drawings:

Referring first to Figures 1, 2, 3 and 4 a separable connector is indicated generally by the reference numeral 11 and is shown as including a socket 12 comprising a plastic or non-conductive shell 12a and a bayonet-type receptacle 12b made of a suitable electrically conductive material having spring rings 12c assembled thereon.

The free ends of a single-wire conductor to be joined by the separable connector 11 are indicated generally by the reference characters A and B. As will be seen on the drawings, the conductor may be suitably sheathed by an oil-resistant waterproof insulating material 13 such as neoprene or the like.

A plug 14 made of a suitable electrically conductive material may be attached to the end A of the conductor and a corresponding plug 16 also made of a suitable electrically conductive material may be affixed to the end B of the conductor.

Referring particularly to Figure 4, a resilient grommet is indicated generally by the reference numeral 17 and may take the form of a moulded rubber element defining an enlarged socket-seating portion 17a through which extends a plug-receiving aperture 17b. The grommet 17 further defines a substantially cylindrical reduced diameter sleeve 17c which extends rearwardly from the socket-seating portion 17a. It will be noted that the socket-seating portion 17a defines an internally disposed recess or groove as at 17d which facilitates deformation of the seating portion when the grommet 17 is placed under compression.

It should also be noted that the lip of the aperture at the enlarged socket-seating portion 17a normally defines a tapered bevel terminating in a reduced diameter portion of smaller diameter than that defined by plugs 14 and 16.

A grommet 17 is placed over each of the plugs, and as may be seen by making specific reference to Figure 3, the bore of the cylindrical portion 17c fits snugly around the insulating material 13 and the lip of the aperture 17b formed at the enlarged socket-seating portion 17a is snugly seated on each plug 14 and 16.

The embodiment of the present invention shown in Figures 1 through 4 is completed by a pair of shells indicated by the reference numerals 18 and 19.

The shell 18 is provided with a pair of diametrically opposed bayonet prongs 18a which are receivable in locking slots 19a formed in the shell 19.

Each of the shells 18 and 19 is further provided with a reduced diameter throat indicated at 18b and 19b which is of such a diameter as to be snugly seated upon the cylindrical sleeve portion 17c of the grommet 17.

The grommet 17 may be slightly tapered as at 17e to afford facile assembly of the shells 18 and 19 over the sleeve portion 17c of the grommet 17.

As will be seen by making specific reference to Figure 3, when the shells 18 and 19 are moved toward one another after the plugs 14 and 16 have been received into the socket 12, the grommets 17 are elastically deformed against their inherent resilience by virtue of the engagement of the socket 12 with the socket-seating portion 17a and the engagement of the throat portions 18b and 19b of the shells 18 and 19 with the sleeve portion 17c of the grommet 17.

Thus, the recess or groove 17d of the grommet 17 tends to permit the enlarged portion 17a to be distended in such a manner as to promote a water-tight seal at the locale of the junction between the socket 12 and the plugs 14 and 16.

It should also be noted that the shells 18 and 19 are locked together by a positive resilient bias provided by the deformed grommets 17.

Referring now to Figures 5 and 6 a separable connector is indicated generally by the reference numeral 11a and is shown as including elements which are substantially identical to those previously described in connection with the separable connector 11 shown in Figures 1 through 4 with the exception that the shell element herein shown and designated by the reference numeral 19' is provided with a throat 19b' which does not snugly engage the cylindrical sleeve portion of the grommet.

To meet this contingency, the grommet previously described may be modified as follows:

Referring specifically to Figure 6, a modified grommet made of a resilient material is indicated generally by the reference numeral 20 and includes an enlarged socket-seating portion 20a terminating in a shoulder 20b which is joined to a reduced diameter sleeve portion 20c extending rearwardly from the enlarged portion 20a. The grommet 20 may be tapered near its ends as at 20d as before and defines a reduced diameter aperture 20e located in the enlarged portion 20a. The enlarged portion 20a may also be tapered or skived along its edge as at 20f.

As shown in Figure 5, the grommet 20 is placed over the plug 16 which, in this particular adaptation, may be provided with an enlarged cylindrical portion 16a lying in abutting relationship to the insulating material 13.

A small adapter ring 21 is provided and preferably takes the form of a cylindrical element having a flared flange on one end thereof. The adapter ring is adapted to fit snugly over the cylindrical sleeve portion 20c of the grommet 20 and lies in abutting relationship to the shoulder 20d. Thus, when the shell 19' is moved into locking engagement with the corresponding shell indicated by the reference numeral 18, the socket 12 engages the tapered edge 20f of the grommet 20 and the shell 19' engages the adapter ring 21 which in turn is compressed against the grommet 20.

By virtue of the novel arrangement described above, the grommet 20 will be elastically deformed and will snugly surround the cylindrical portion 16a formed on the plug 16 in such a manner as to define a water-tight seal at the locale between the socket 12 and the plug 16.

Referring now to Figures 7, 8, 9 and 10, a multi-wire separable connector is indicated generally by the reference numeral 25. By way of example, the embodiment of the multi-wire separable connector 25 is shown in connection with a three wire junction, however, it will be readily understood that the principles of this invention are equally applicable to any other combination of conductors in a separable connector.

It will be noted upon making reference to Figure 10 that the right hand portion of the connector 25 is similar to the structures described above. Thus, it is seen that the connector 25 may include a conductor C sheathed by an insulator 26 and capped by a plug 27. A grommet 28 surrounds the plug 27 and the insulator 26 and receives an adapter ring 29 which, in turn, seats the throat 30a of a shell 30.

The other end of the connector 25 includes a shell 31 suitably slotted as at 31a to provide interconnecting locking means with the shell 30.

A socket 32 made of an insulating material such as a hard moulded oil-resistant rubber may be disposed within the shells 30 and 31 and the socket 32 is herein shown as defining a plurality of receptacles 33 for receiving the plugs 34 and 36 affixed to the ends of conductors D and E respectively. The conductors D and E are also sheathed by suitable insulating material 26.

It may be noted that the receptacles 33 are provided with spring rings 33a, preferably made of beryllium copper, which are assembled over the ends of the receptacles. The rings 33a apply additional tension against the plugs 34 and 36, thereby improving electrical contact and preventing the possibility of the inner receptacle assembly from being over-expanded. Similar spring rings 12c are shown in the embodiment described in connection with Figures 1-6.

Referring particularly to Figures 8 and 9, a modified grommet is indicated at 37 and is shown as including a socket-seating portion 37a beveled as at 37b and defining a plurality of plug receiving apertures 37c. The enlarged portion 37a terminates in a shoulder 37d and a plurality of substantially cylindrical sleeve portions 37e extend rearwardly therefrom. The sleeve portions 37e may be tapered as at 37f if desired.

In assembly, it will be noted that the grommet 37 serves to place the plugs 34 and 36 in predetermined spaced relationship. Therefore, the plugs 34 and 36 may be quickly inserted into the appropriate receptacles 33 of the socket 32 when so spaced.

An adapter ring 29 may be slipped over each cylinder sleeve portion 37e of the grommet 37 and the shell 31 may be brought up for locking engagement with the shell 30.

Thus, it will be noted that the edges of the socket 32 will engage the beveled edge 37b of the grommet 37 and the coaction of the adapter rings 29 against the cylindrical sleeve portions 37e of the grommet 37 will compressibly deform the grommet 37 against its inherent resilient bias in such a manner as to provide a water-tight seal at the locale of the junction between the plugs 34 and 36 and the socket 32.

It should be also be noted that the shells 30 and 31 will be locked together by a positive resilient bias provided by the deformed grommets 37 and 28.

It should be evident to those versed in the art that I have described a novel and improved separable connector wherein the arrangement of elementary component parts provide for effective water-tight sealing of an electrical juncture which is locked together under a positive resilient bias.

Although I have resorted to detail in the description of my invention for the sake of clarity, it should be understood that I do not propose to be limited to the specific embodiment herein shown by way of example only.

I claim as my invention:

1. A separable connector comprising, in combination, a socket, a plug in each end of said socket, a resilient grommet on each plug, said grommet defining an enlarged socket seating portion and a substantially cylindrical sleeve portion, a shell snugly seated on the sleeve portion of each grommet, said shells defining interconnecting elements, whereby said shells may be interlocked against the resilient bias of said grommets, thereby deforming said grommets to form a water-tight seal at the locale of said socket and plugs.

2. A waterproof connector comprising a receptacle, a pair of conductors, a pair of bayonet type plugs on the ends of said conductors and received in opposite ends of said receptacle, a resilient grommet snapped on each of said plugs, each grommet comprising a cylindrical sleeve concentric to said conductor wires and a pair of interlocking shells, each of said shells having a throat of such diameter as to snugly engage the sleeve of a corresponding grommet, said shells being resiliently biased when in locked together relationship by said grommets, said grommets being resiliently deformed by said shells and said receptacle to form a waterproof joint around said conductors.

3. A separable connector for a multi-wire junction comprising in combination, a socket, a plurality of plugs receivable in said socket, a first resilient grommet defining a single plug aperture and having a socket-seating portion around said aperture as well as a substantially cylindrical sleeve portion extending rearwardly therefrom, a second resilient grommet defining a plurality of plug apertures and having a single socket-seating portion through which said plug apertures extend as well as a plurality of substantially cylindrical sleeve portions extending rearwardly therefrom and interlocking means seated on said sleeve portions of said first and second grommets and locked against the resilient bias of said grommets thereby deforming said grommets to form a water-tight seal at the locale of said socket and said plugs.

4. A separable connector for a multi-wire junction comprising in combination, a socket, a plurality of plugs receivable in said socket, a resilient grommet defining a single plug aperture and having a socket-seating portion around said aperture as well as a substantially cylindrical sleeve portion extending rearwardly therefrom, a resilient grommet defining a plurality of plug apertures and having a single socket-seating portion through which said plug apertures extend as well as a plurality of substantially cylindrical sleeve portions extending rearwardly therefrom and interlocking means seated on said sleeve portions and locked against the resilient bias of said grommets thereby deforming said grommets to form a water-tight seal at the locale of said socket and said plugs, said interlocking means including adapter rings snugly seated on said sleeve portions and detented shells cooperable with said adapter rings and with each other to form a locked-together unitary connector.

5. A separable connector, comprising, in combination, an open-ended current continuing member comprising a socket, a plug received in each end of said socket, a resilient grommet on each plug, each grommet having a socket-seating shoulder engaging the end of said socket, and a shell receptacle for each plug, each of said shell receptacles having a grommet seating portion on one end engaging one of said grommets and a quick-disconnect interlocking means on the other end, said shell receptacles arranged to interlockingly engage one another and to concurrently deform said grommets, thereby to provide a positive resilient locking bias and to seal said plugs in opposite ends of said socket.

6. A separable connector, comprising, in combination, an open-ended current continuing member comprising a socket, a plug received in each end of said socket, a resilient grommet on each plug, each grommet having a socket seating shoulder engaging the end of said socket and a substantially cylindrical sleeve portion extending away from said shoulder, an adapter ring seated on said sleeve portion of each grommet, and shell receptacle means seated on said adapter rings, said receptacle means having quick-disconnect interlocking members arranged to interlock against the resilience bias of said grommets, said grommets being elastically deformable to concurrently form a water-tight seal between said plugs and said socket.

7. In a waterproof separable connector, the combination comprising a shelllike socket having an inwardly converging tapered rim, a plug extending into said socket, a tubular grommet elastically fitted on said plug and having a raised end shoulder portion with an inclined face confronting said tapered socket rim and seating thereon, retaining means carried in said socket and detachably engaging said plug to maintain such seating relationship, a shell receptacle snugly surrounding said grommet and slidable against said shoulder portion to compress and seal the same against said socket rim, said shell receptacle having a locking rim portion surrounding and spaced from said socket, and means engageable with said shell receptacle for locking the same on said grommet.

8. A separable connector, comprising, in combination, an open-ended current continuing member comprising a socket, a plug received in each end of said socket, a grommet of each plug, said grommet comprising a generally tubular member receiving the plug and being provided with a generally cylindrical external surface having a peripheral rib projecting outwardly therefrom, one side of said rib engaging the open end of said socket, and interlocking means engaging the surface portions of the respective grommets on the other side of each respective peripheral rib to elastically deform said grommets, thereby providing a resilient locking bias and elastically deforming said grommets to form a water-tight seal between said plugs and said socket.

9. A separable connector, comprising, in combination, an open-ended socket, a current continuing member therein, a plug inserted in each end of said socket and received by said current continuing member, spring rings on the ends of said current continuing member improving electrical contact between said plugs and said member and controlling expansion of the ends of said member, resilient grommet means carried by each of said plugs and engaging said socket, and interlocking members seated against said grommet means elastically deforming said grommet means, thereby forming a water-tight seal between said plugs and said socket, said seal being resiliently locked by a positive resilient locking bias provided by the deformation of said grommet means.

WAYNE V. RICHARDS.

REFERENCES CITED

The following references are of record in the file of this patent:

UNITED STATES PATENTS

| Number | Name | Date |
|---|---|---|
| 1,965,087 | Sharp | July 3, 1934 |
| 2,047,126 | Hastings | July 7, 1936 |
| 2,158,004 | Douglas | May 9, 1939 |
| 2,188,596 | Hobert | Jan. 30, 1940 |
| 2,265,341 | Borchert | Dec. 9, 1941 |
| 2,291,793 | Chandler | Aug. 4, 1942 |
| 2,301,447 | Parker et al. | Nov. 10, 1942 |
| 2,311,427 | Winkelmeyer | Feb. 16, 1943 |
| 2,318,649 | Penfold | May 11, 1943 |
| 2,337,618 | Miller | Dec. 28, 1943 |
| 2,346,831 | Drury | Apr. 18, 1944 |
| 2,355,126 | Webster et al. | Aug. 8, 1944 |
| 2,440,279 | Larkins, Jr. | Apr. 27, 1948 |
| 2,501,674 | Graham | Mar. 28, 1950 |
| 2,521,056 | Frei et al. | Sept. 5, 1950 |

FOREIGN PATENTS

| Number | Country | Date |
|---|---|---|
| 433,622 | England | Aug. 19, 1935 |
| 693,052 | Germany | July 1, 1940 |
| 811,155 | France | Apr. 8, 1937 |